(12) United States Patent
Nakano et al.

(10) Patent No.: US 10,414,100 B2
(45) Date of Patent: Sep. 17, 2019

(54) METHOD FOR BONDING COMPOSITE MATERIALS AND DEVICE FOR BONDING COMPOSITE MATERIALS

(71) Applicant: Nissan Motor Co., Ltd., Yokohama-shi, Kanagawa (JP)

(72) Inventors: Takahiro Nakano, Kanagawa (JP); Toshiaki Oorui, Kanagawa (JP); Shinji Fujisawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 362 days.

(21) Appl. No.: 15/322,483

(22) PCT Filed: Jul. 3, 2014

(86) PCT No.: PCT/JP2014/067842
§ 371 (c)(1),
(2) Date: Dec. 28, 2016

(87) PCT Pub. No.: WO2016/002059
PCT Pub. Date: Jan. 7, 2016

(65) Prior Publication Data
US 2017/0120505 A1    May 4, 2017

(51) Int. Cl.
*B23K 20/00*    (2006.01)
*B29C 65/00*    (2006.01)
(Continued)

(52) U.S. Cl.
CPC ............ *B29C 65/085* (2013.01); *B23K 20/10* (2013.01); *B23K 20/16* (2013.01); *B23K 20/233* (2013.01);
(Continued)

(58) Field of Classification Search
CPC ........ B23K 20/00; B23K 20/10; B23K 20/16; B23K 20/20; B23K 20/23; B23K 20/233; B29C 65/00; B29C 65/08; B29C 65/085; B29C 65/081; B29C 65/087; B29C 65/10; B29C 65/18; B29C 65/70; B29C 65/72; B29C 65/78; B29C 65/784;
(Continued)

(56) References Cited

U.S. PATENT DOCUMENTS

2012/0006810 A1    1/2012    Fan et al.

FOREIGN PATENT DOCUMENTS

| JP | H3-32478 A | 2/1991 |
| JP | 2001-47257 A | 2/2001 |

(Continued)

*Primary Examiner* — Jacob T Minskey
*Assistant Examiner* — Matthew Hoover
(74) *Attorney, Agent, or Firm* — Global IP Counselors, LLP

(57) ABSTRACT

A method is used for a pair of bonding composite materials that are each provided with a melting material and a heat-resistant material. Each heat-resistant material includes a heat-resistant member and a binder member. The ceramic separators have ceramic layers that face each other and that are bonded. An ultrasonic wave is applied to the composite materials while applying a pressure thereto with a processing member. Also heat is applied to the binder members with a heating member. Here, the heater heats the binder members to a temperature that is greater than or equal to the glass transition temperature of the binder members and less than the melting point of the binder members.

10 Claims, 7 Drawing Sheets

(51) Int. Cl.
| | |
|---|---|
| H01M 2/00 | (2006.01) |
| H01M 10/00 | (2006.01) |
| B29C 65/08 | (2006.01) |
| B23K 20/10 | (2006.01) |
| H01M 2/14 | (2006.01) |
| H01M 2/16 | (2006.01) |
| H01M 10/0525 | (2010.01) |
| B23K 20/16 | (2006.01) |
| B23K 20/233 | (2006.01) |
| B29C 65/18 | (2006.01) |
| B29C 65/72 | (2006.01) |
| B29C 65/78 | (2006.01) |
| B29K 23/00 | (2006.01) |
| B29L 31/34 | (2006.01) |
| B23K 101/36 | (2006.01) |
| B23K 103/16 | (2006.01) |
| B23K 103/00 | (2006.01) |

(52) U.S. Cl.
CPC ............ *B29C 65/08* (2013.01); *B29C 65/081* (2013.01); *B29C 65/087* (2013.01); *B29C 65/18* (2013.01); *B29C 65/72* (2013.01); *B29C 65/787* (2013.01); *B29C 65/7847* (2013.01); *B29C 65/7891* (2013.01); *B29C 65/7894* (2013.01); *B29C 66/006* (2013.01); *B29C 66/1122* (2013.01); *B29C 66/133* (2013.01); *B29C 66/433* (2013.01); *B29C 66/71* (2013.01); *B29C 66/727* (2013.01); *B29C 66/72325* (2013.01); *B29C 66/81429* (2013.01); *B29C 66/81463* (2013.01); *B29C 66/8322* (2013.01); *B29C 66/83413* (2013.01); *B29C 66/8432* (2013.01); *B29C 66/91212* (2013.01); *B29C 66/91221* (2013.01); *B29C 66/91411* (2013.01); *B29C 66/91421* (2013.01); *B29C 66/91935* (2013.01); *B29C 66/91943* (2013.01); *B29C 66/961* (2013.01); *H01M 2/145* (2013.01); *H01M 2/166* (2013.01); *H01M 2/1673* (2013.01); *H01M 2/1686* (2013.01); *H01M 10/0525* (2013.01); *B23K 2101/36* (2018.08); *B23K 2103/172* (2018.08); *B23K 2103/42* (2018.08); *B23K 2103/52* (2018.08); *B29K 2023/12* (2013.01); *B29L 2031/3468* (2013.01)

(58) Field of Classification Search
CPC . B29C 65/7847; B29C 65/787; B29C 65/789; B29C 65/7891; B29C 65/7894; B29C 66/00; B29C 66/10; B29C 66/11; B29C 66/112; B29C 66/1122; B29C 66/13; B29C 66/133; B29C 66/40; B29C 66/43; B29C 66/433; B29C 66/70; B29C 66/71; B29C 66/72; B29C 66/723; B29C 66/7232; B29C 66/72325; B29C 66/727; B29C 66/80; B29C 66/81; B29C 66/814; B29C 66/8142; B29C 66/81429; B29C 66/8146; B29C 66/81463; B29C 66/83; B29C 66/832; B29C 66/8322; B29C 66/834; B29C 66/8341; B29C 66/83413; B29C 66/84; B29C 66/843; B29C 66/8432; B29C 66/90; B29C 66/91; B29C 66/912; B29C 66/9122; B29C 66/91221; B29C 66/914; B29C 66/9142; B29C 66/91421; B29C 66/96; B29C 66/961; H01M 2/00; H01M 2/10; H01M 2/14; H01M 2/145; H01M 2/16; H01M 2/166; H01M 2/167; H01M 2/1673; H01M 2/168; H01M 2/1686; H01M 10/00; H01M 10/05; H01M 10/052; H01M 10/0525

See application file for complete search history.

(56) References Cited

FOREIGN PATENT DOCUMENTS

| | | |
|---|---|---|
| JP | 2002-134093 A | 5/2002 |
| JP | 2010-146732 A | 7/2010 |
| JP | 2013-143336 A | 7/2013 |
| JP | 2014-86267 A | 5/2014 |

…

METHOD FOR BONDING COMPOSITE MATERIALS AND DEVICE FOR BONDING COMPOSITE MATERIALS

CROSS-REFERENCE TO RELATED APPLICATIONS

This application is a U.S. National stage application of International Application No. PCT/JP2014/067842, filed Jul. 3, 2014.

BACKGROUND

Field of the Invention

The present invention relates to a method for bonding composite materials and a bonding device embodying the bonding method.

Background Information

Conventionally, there is a boding method for boding laminated materials formed by laminating members that greatly differ in melting point to each other, by applying an ultrasonic wave and heating. The laminated material to be used is, for example, obtained by laminating polypropylene (corresponding to a melting material with a relatively low melting point) and aluminum foil (corresponding to a heat-resistant material with a relatively high melting point). In this bonding method, a pair of composite materials are bonded to each other with the melting materials thereof facing each other (for example refer to the Japanese Laid-Open Patent Application No. 2001-47257—Patent Document 1.).

SUMMARY

However, in a configuration such as the above-described Patent Document 1, when bonding a pair of composite materials with the heat-resistant materials thereof facing each other, if heated to a temperature at which the heat-resistant materials are softened, there is the risk that melting materials having a lower melting temperature than the heat-resistant materials are fused or are caused to adhere to the processing members. On the other hand, there is the risk that, even if the pair of the composite materials are heated to a temperature at which the melting materials are softened, the heat-resistant materials having a higher melting temperature than the melting materials are not sufficiently softened, preventing bonding.

In order to achieve the above-described object, the present invention provides a method for bonding composite materials with which it is possible to bond a pair of composite materials, each comprising a melting material and a heat-resistant material, to each other with the heat-resistant materials facing each other, and a device for bonding composite materials that embodies the bonding method.

The method for bonding composite materials according to the present invention that achieves the object described above is a method that uses composite materials, each provided with a melting material, a heat-resistant material comprising a heat-resistant member having a higher melting temperature than the melting material, and a binder member that binds the heat-resistant member to the melting material, to bond a pair of composite materials to each other, with the heat-resistant materials facing each other. The bonding method comprises a bonding step. In the bonding step, an ultrasonic wave is applied to the composite materials while applying pressure thereto with a processing member, and heat is applied to the binder member by a heating member, to thereby move the heat-resistant members from the bonding portion to the surrounding area and to bond the melting materials that are opposed to each other. Here, in the bonding step, the binder member is heated with the heating member to a temperature that is greater than or equal to the glass transition temperature and less than the melting point.

The device for bonding composite materials according to the present invention that achieves the object described above is a device that uses composite materials, each provided with a melting material and a heat-resistant material, comprising a heat-resistant member having a higher melting temperature than the melting material and a binder member that binds the heat-resistant member to the melting material, to bond a pair of composite materials to each other, with the heat-resistant materials facing each other. The bonding device comprises a processing member and a heating member. The processing member applies an ultrasonic wave to the composite material while applying pressure to the composite material with the processing member. The heating member heats the binder member to a temperature that is greater than or equal to the glass transition temperature and less than the melting point.

DETAILED DESCRIPTION OF THE EMBODIMENTS

Figure 1:
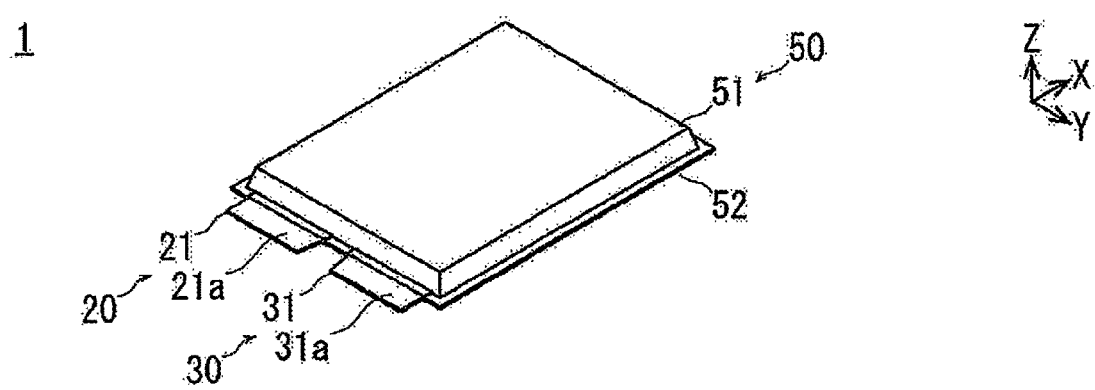
FIG. 1 is a perspective view illustrating a lithium ion secondary battery configured using the composite materials (ceramic separators) according to a first embodiment.

First and second embodiments in accordance with the present invention will be described below with reference to the appended drawings. In the explanations of the drawings, the same elements are given the same reference symbols, and overlapping explanations the same elements are omitted. The sizes and ratios of the members in the drawing are exaggerated for the convenience of explanation and may be different from the actual sizes and ratios. In all the drawings from FIG. 1 to FIG. 8, the orientations are shown using arrows represented by X, Y, and Z. The direction of the arrow indicated by X indicates a final transport direction X of ceramic separators 40, positive electrodes 20, etc. The direction of the arrow indicated by Y indicates an intersecting direction Y that intersects the transport direction X. The direction of the arrow indicated by Z indicates a laminate layer direction Z of the ceramic separators 40 and the positive electrodes 20.

First Embodiment

Figure 2:
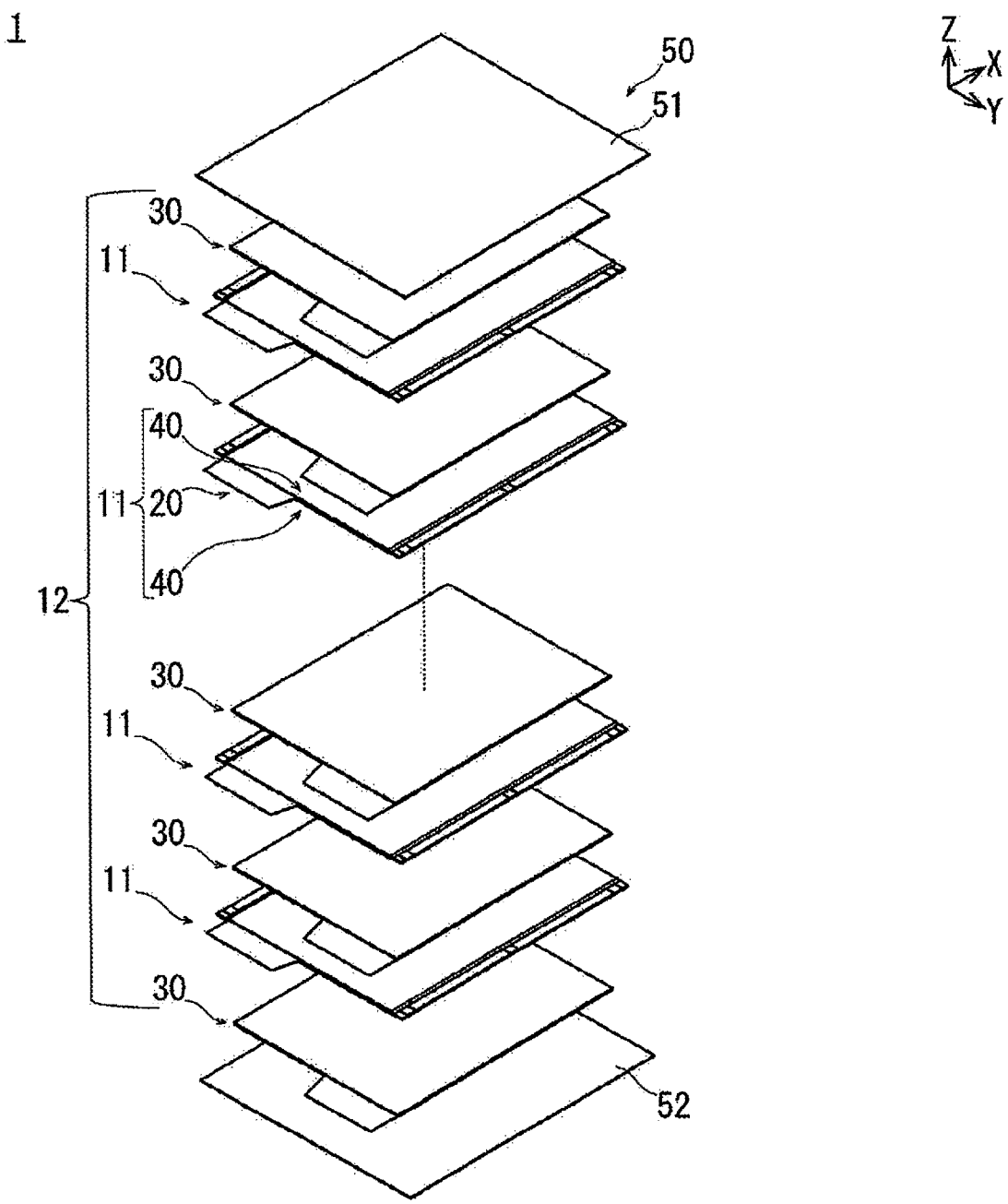
FIG. 2 is an exploded perspective view illustrating the lithium ion secondary battery of FIG. 1 exploded to show each component member.
Figure 3:
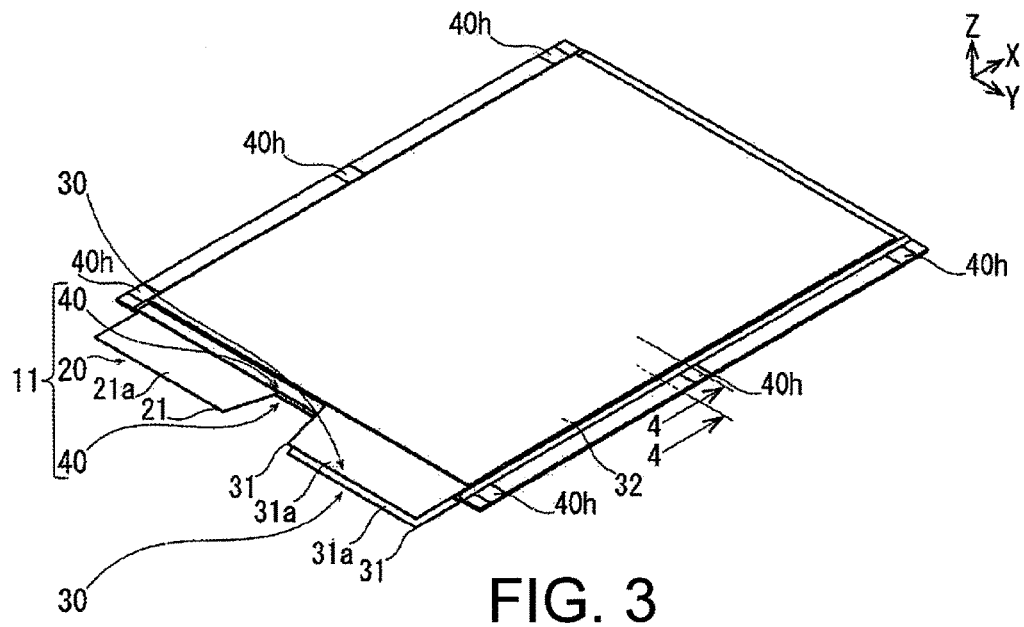
FIG. 3 is a perspective view illustrating a state in which negative electrodes are respectively laminated on both sides of the bagged electrode of FIG. 1.
Figure 4:
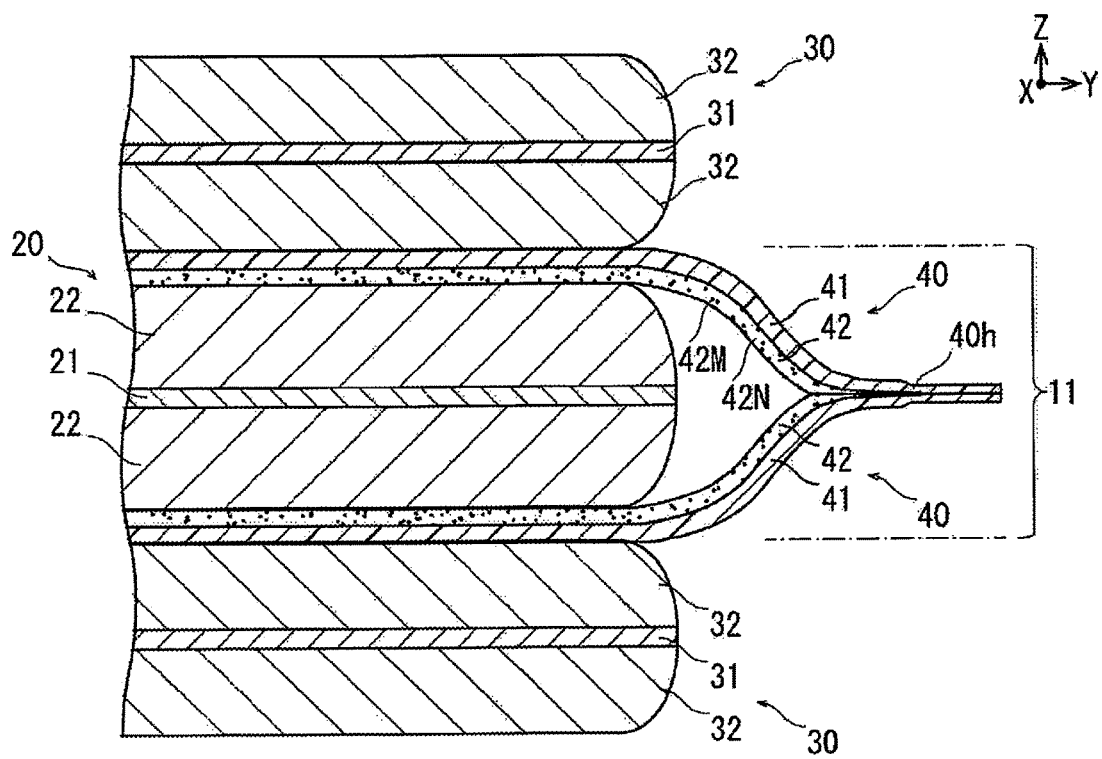
FIG. 4 is a partial cross-sectional view illustrating the configuration of FIG. 3 taken along line 4-4 shown in FIG. 3.

The composite materials (the ceramic separators 40) to be bonded by the bonding device 100 are shown particularly in FIGS. 2 to 4 among FIGS. 1 to 4. The composite materials (ceramic separators 40) are used, for example, in forming a plurality of bagged electrodes 11 that are used in a lithium ion secondary battery 1.

The lithium ion secondary battery 1 is formed by sealing an exterior material 50 about a power generating element 12, which carries out charging/discharging. The power generating element 12 is formed by alternately stacking a plurality of negative electrodes 30 and a plurality of the bagged electrodes 11, which are formed by bonding after sandwiching the positive electrodes 20 with a pair of ceramic separators 40. Even if the lithium ion secondary battery 1 is vibrated or receives an impact, short circuiting is prevented between adjacent ones of the positive electrodes 20 and the negative electrodes 30 via the ceramic separator 40 by suppressing the movement of the positive electrode 20 with bonding portions 40h formed at both ends of a pair of the ceramic separators 40. Details of the lithium ion secondary battery 1 using composite materials (the ceramic separators 40) will be described later.

Figure 5:
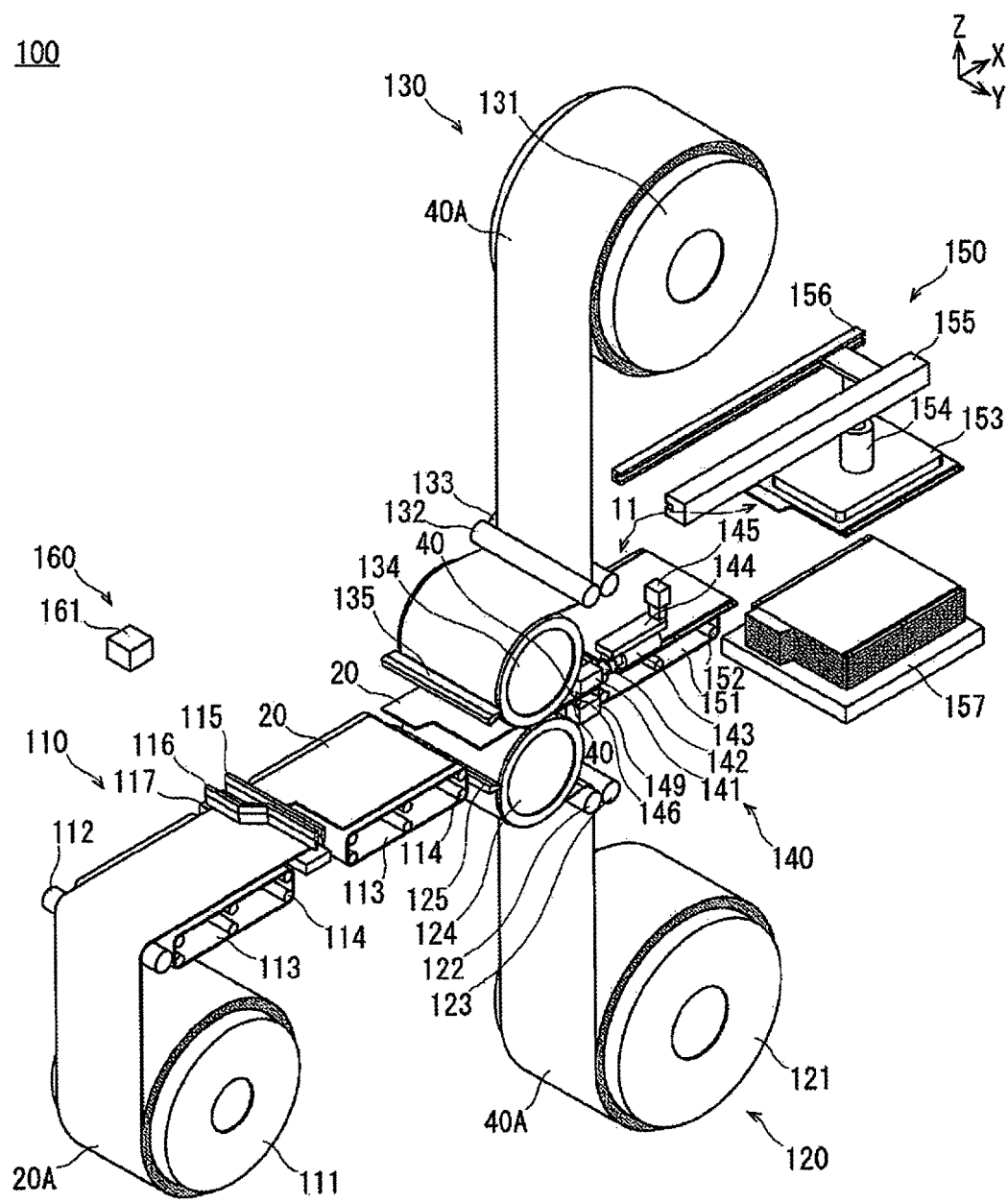
FIG. 5 is a perspective view illustrating a device for bonding composite materials according to a first embodiment.
Figure 6:
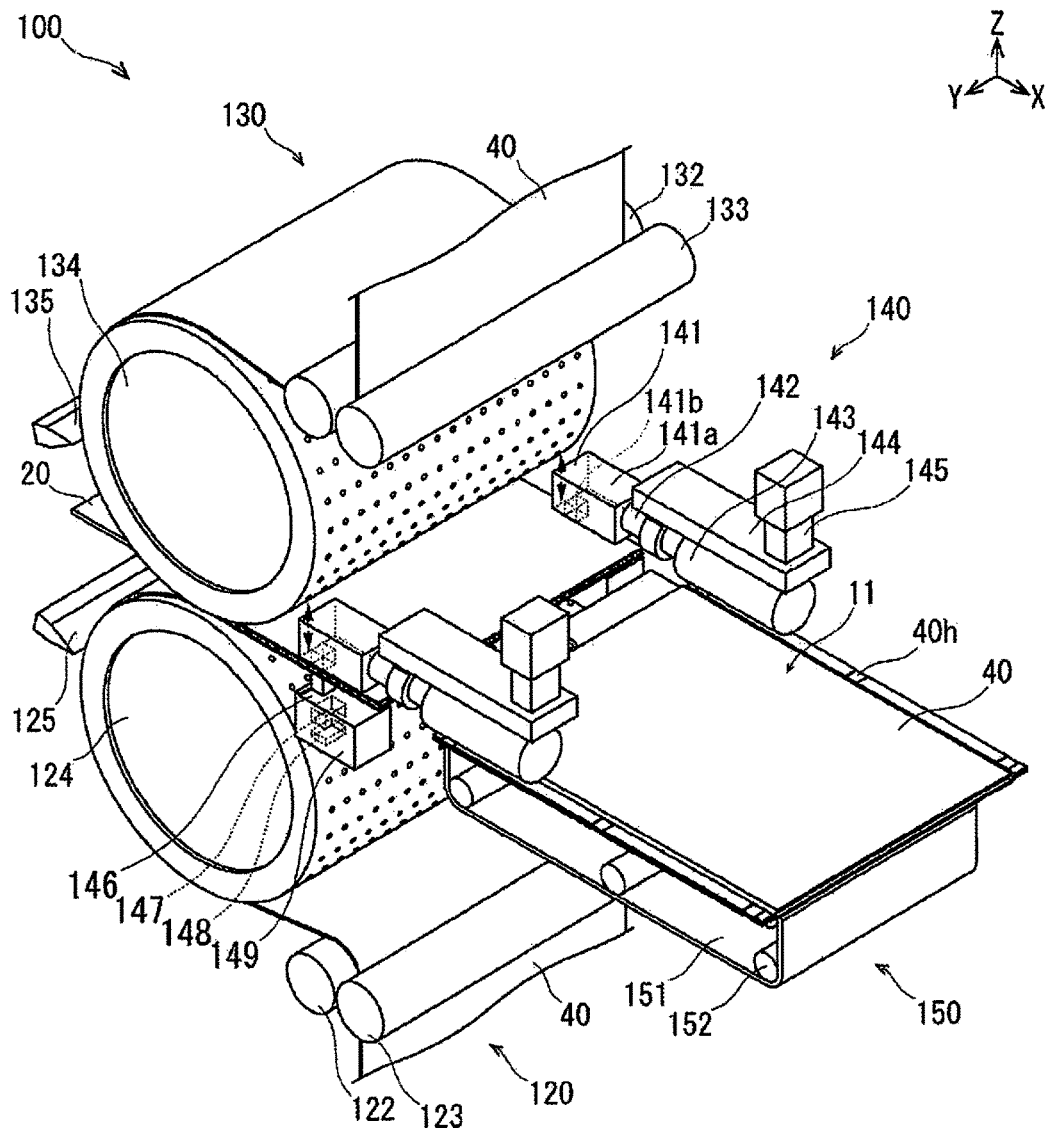
FIG. 6 is a perspective view illustrating the principle parts of the bonding device of FIG. 5.
Figure 7:
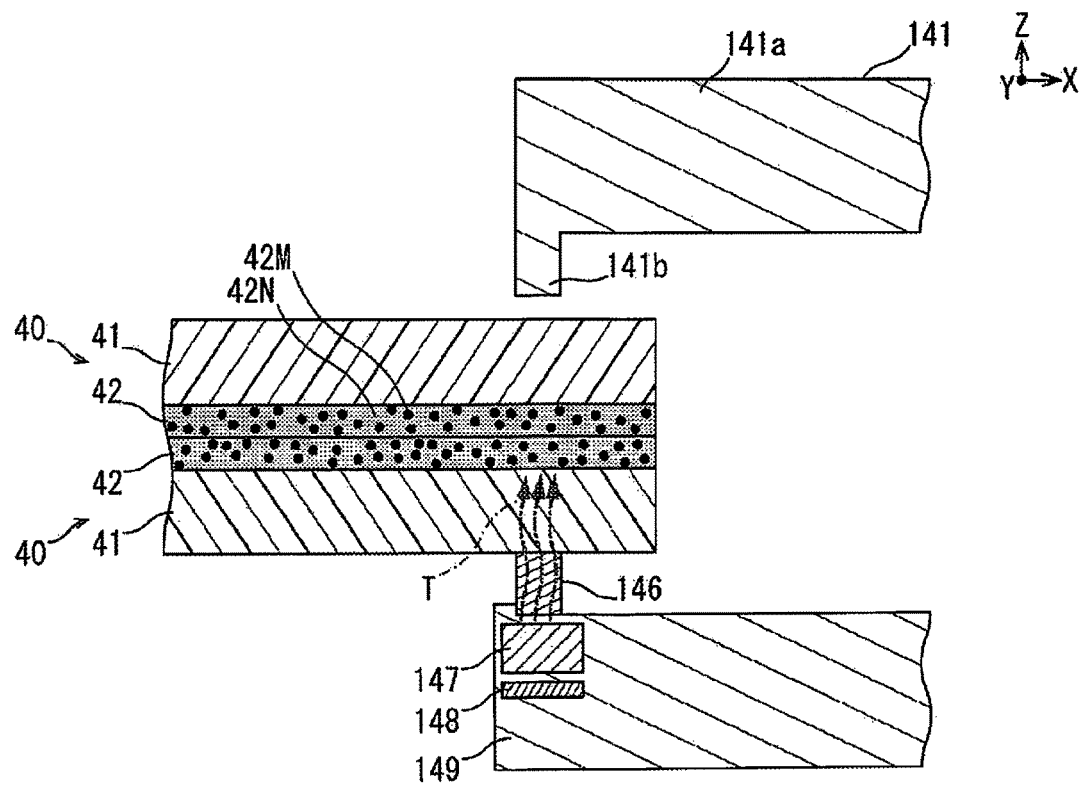
FIGS. 7(A) and 7(B) are partial cross-sectional views schematically illustrating the states in which a pair of ceramic separators are bonded to each other by the bonding device of FIG. 5.
Figure 7:
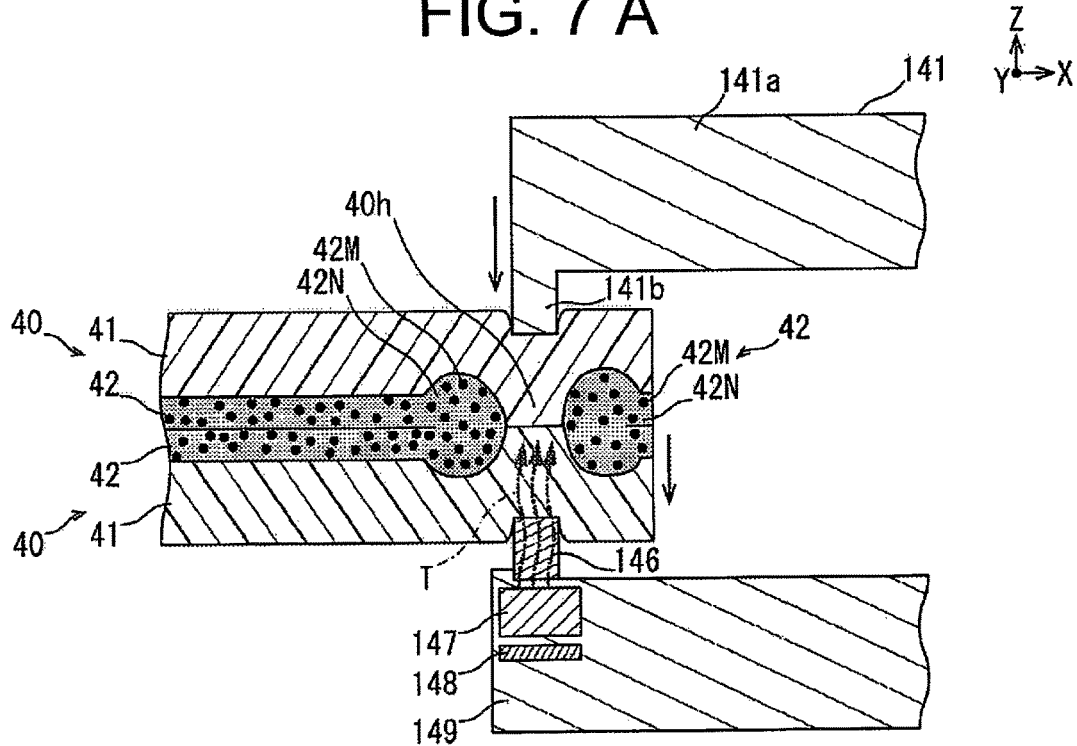

The bonding device 100 is illustrated in FIGS. 5 to 7. The bonding device 100 bonds a pair of composite materials (the ceramic separators 40) to each other.

The bonding device 100 bonds ceramic separators 40 to each other, comprising melting material (polypropylene layer 41) and a heat-resistant material (ceramic layer 42) that is laminated on the polypropylene layer 41 that has a higher melting temperature than the polypropylene layer 41. The bonding device 100 comprises an electrode conveyance unit 110 for transporting electrodes (positive electrode 20 or negative electrode 30); a first separator conveyance unit 120 for transporting a ceramic separator 40 that is laminated on one surface of the positive electrode 20; and a second separator conveyance unit 130 for transporting a ceramic separator 40 that is laminated on the other surface of the positive electrode 20. In addition, the bonding device 100 comprises a separator bonding unit 140 that bonds a pair of ceramic separators 40 to each other; a bagged electrode conveyance unit 150 that transports a bagged electrode 11, and a control unit 160 that controls the respective operation of each component member. Details of the bonding device 100 will be described later.

First, the composite materials (ceramic separators 40) that are bonded to each other by the bonding device 100 will be described based on the configuration of the lithium ion secondary battery 1 using the composite materials (ceramic separators 40), with reference to FIGS. 1 to 4.

FIG. 1 is a perspective view illustrating a lithium ion secondary battery 1 configured using composite materials (ceramic separators). FIG. 2 is an exploded perspective view illustrating the lithium ion secondary battery 1 of FIG. 1 exploded to show each component member. FIG. 3 is a perspective view illustrating a state in which negative electrodes 30 are respectively laminated on both sides of the bagged electrode 11 of FIG. 1. FIG. 4 is a partial cross-sectional view illustrating the configuration of FIG. 3 taken along line 4-4 shown in FIG. 3.

The positive electrode 20 corresponds to an electrode, and is formed by binding positive electrode active materials on both surfaces of a positive electrode current collector 21, which is a conductive body. A positive electrode terminal 21a that takes out power is formed extending from a portion of one end of the positive electrode current collector 21. The positive electrode terminals 21a of a plurality of laminated positive electrodes 20 are fixed to each other by welding or adhesion.

Examples of materials used for the positive electrode current collector 21 of the positive electrode 20 include aluminum expanded metal, aluminum mesh, and aluminum punched metal. Examples of materials used for the positive electrode active material of the positive electrode 20 include various oxides (lithium manganese oxides such as $LiMn_2O_4$, manganese dioxide, lithium nickel oxides such as $LiNiO_2$, lithium cobalt oxides such as $LiCoO_2$, lithium-containing nickel cobalt oxides, or amorphous vanadium pentoxide containing lithium) and chalcogen compounds (titanium disulfide, molybdenum disulphide).

The negative electrode 30 corresponds to an electrode with a different polarity than the positive electrode 20, and is formed by binding negative electrode active material 32 on both surfaces of a negative electrode current collector 31, which is a conductive body. A negative electrode terminal 31a is formed extending from a portion of one end of the negative electrode current collector 31 so as to not overlap with the positive electrode terminal 21a formed on the positive electrode 20. The longitudinal length of the negative electrode 30 is longer than the longitudinal length of the positive electrode 20. The lateral dimension of the negative electrode 30 is the same as the lateral dimension of the positive electrode 20. The negative electrode terminals 31a of a plurality of laminated negative electrodes 30 are fixed to each other by welding or adhesion.

Examples of materials used for the negative electrode current collector 31 of the negative electrode 30 include copper expanded metal, copper mesh, and copper punched metal. A carbon material that absorbs and releases lithium ions is used as a material for the negative electrode active material 32 of the negative electrode 30. Examples of such carbon material include natural graphite, artificial graphite, carbon black, activated carbon, carbon fiber, coke, or carbon synthesized by thermal treating an organic precursor (phenol resins, polyacrylonitrile, or cellulose) in an inert atmosphere.

The ceramic separator 40 is provided between the positive electrode 20 and the negative electrode 30, and electrically isolates the positive electrode 20 and the negative electrode 30. The ceramic separator 40 holds an electrolytic solution between the positive electrode 20 and the negative electrode 30 to ensure conductance of lithium ions. The ceramic separator 40 is formed in a rectangular shape. The longitudinal length of the ceramic separator 40 is longer than the longitudinal length of the negative electrode 30 excluding the negative electrode terminal 31a portion.

The ceramic separator 40 is formed, for example, by laminating a ceramic layer 42, corresponding to a heat-resistant material, to a polypropylene layer 41 corresponding to a melting material, as illustrated in FIG. 4. The ceramic layer 42 has a higher melting temperature than the polypropylene layer 41. A pair of ceramic separators 40 sandwich the positive electrode 20, and the ceramic layers 42 are laminated facing each other. That is, the ceramic layers 42 are in contact with the positive electrode active material of the positive electrode 20.

The polypropylene layer 41 of the ceramic separator 40 is configured forming a sheet of polypropylene. The polypropylene layer 41 is impregnated with a nonaqueous electrolyte solution prepared by dissolving electrolytes in a nonaqueous solvent. Polymers are contained in order to retain the nonaqueous electrolyte solution in the polypropylene layer 41. The ceramic layer 42 is formed by, for example, applying a slurry obtained by respectively dispersing, into a volatile solvent, ceramic particles 42M, which correspond to a heat-resistant member obtained by forming an inorganic compound at a high temperature, and a binder 42N, which corresponds to a binding member, onto the polypropylene layer 41 and drying. Each of the ceramic particles 42M is fixed to the polypropylene layer 41 by the binder 42N. The ceramic layer 42 is made of a porous material formed by a binder 42N and ceramic particles 42M, such as silica, alumina, zirconium oxide, and titanium oxide.

The pair of ceramic separators 40 are bonded to each other by a plurality of bonding portions 40h respectively formed at both sides in the longitudinal direction along the transport direction X of the bonding device 100. In the bonding portion 40h, the polypropylene layer 41 and the binder 42N are partially melted in a state in which the ceramic layers 42 are facing each other, while the ceramic layer 42 adjacent to the polypropylene layer 41 is moved to the surrounding area. That is, the bonding portion 40h is formed by welding to each other the polypropylene layers 41 that are facing each other due to the ceramic layers 42 being moved to the surrounding area.

A pair of ceramic separators 40 are laminated so as to sandwich the two surfaces of a positive electrode 20, then bagged to configure a bagged electrode 11. For example, a total of three bonding portions 40h are each formed at the two ends and the central portion on both sides of the pair of ceramic separators 40 along the longitudinal direction. Even if the lithium ion secondary battery 1 is oscillated or receives an impact, the movement of the positive electrode 20 in the bagged electrode 11 can be suppressed, with bonding portions 40h formed at both ends of the ceramic separators 40 in the longitudinal direction. That is, short circuiting is prevented between the positive electrode 20 and the negative electrode 30, which are adjacent to each other, via the ceramic separator 40. Therefore, the lithium ion secondary battery 1 is able to maintain the desired electrical characteristics.

The exterior material 50 is configured, for example, from laminated sheets 51 and 52, which comprise metal plates inside, and coats a power generating element 12 from both sides to form a seal. When sealing the power generating element 12 with the laminated sheets 51 and 52, a portion of the periphery of the laminated sheets 51 and 52 is opened while the other peripheral portions are sealed by thermal welding or the like. An electrolytic solution is injected from the opened portions of the laminated sheets 51 and 52 to impregnate the ceramic separators 40, etc., in the electrolytic solution. Air is removed by reducing the inside pressure the pressure from the opened portions of the laminated sheets 51 and 52, and the opened portions are also heat-sealed to form a complete seal.

The laminated sheets 51 and 52 of the exterior material 50 form, for example, a three-layer structure by each laminating three types of materials. The first layer corresponds to a thermal adhesive resin; for example, polyethylene (PE), ionomers, or ethylene vinyl acetate (EVA) is used. The material of the first layer is placed adjacent to the negative electrode 30. The second layer corresponds to a metal formed into a foil; for example, an Al foil or a Ni foil is used. The third layer corresponds to a resin film; for example, rigid polyethylene terephthalate (PET) or nylon is used.

Next, the configuration of the bonding device 100 (electrode conveyance unit 110, first separator conveyance unit 120, second separator conveyance unit 130, separator bonding unit 140, bagged electrode conveyance unit 150, and control unit 160) that embodies the method of bonding composite materials (ceramic separators 40) will be described in order, with reference to FIGS. 5 and 6.

FIG. 5 is a perspective view illustrating the bonding device 100. FIG. 6 is a perspective view illustrating the principle parts of the bonding device 100 of FIG. 5.

The electrode conveyance unit 110, illustrated in FIG. 5, cuts out and transports a positive electrode 20 from an elongated positive electrode substrate 20A.

An electrode feed roller 111 of the electrode conveyance unit 110 holds the positive electrode substrate 20A. The electrode feed roller 111 has a cylindrical shape, and the elongated positive electrode substrate 20A is wound thereon. The conveyance roller 112 guides the positive electrode substrate 20A to the conveyor belt 113. The conveyance roller 112 has an elongated cylindrical shape, and guides the positive electrode substrate 20A wound on the electrode feed roller 111 to the conveyor belt 113 while applying a constant tension thereon. The conveyor belt 113 is for transporting the positive electrode substrate 20A. The conveyor belt 113 comprises an endless belt provided with a plurality of suction openings on the outer perimeter surface, and transports the positive electrode substrate 20A under a suction state along the transport direction X. The width of the conveyor belt 113 along the intersecting direction Y which intersects the transport direction X is longer than the width of the positive electrode substrate 20A. The rotating roller 114 is for rotating the conveyor belt 113. A plurality of rotating rollers 114 are arranged on the inner perimeter surface of the conveyor belt 113 along the intersecting direction Y, to rotate the conveyor belt 113. Of the plurality of rotating rollers 114, one is a drive roller provided with power, and the others are driven rollers which are driven with the drive roller. The conveyance roller 112 and the electrode feed roller 111 are rotated by being driven by the rotation of the conveyor belt 113.

The cutting blades 115 and 116 of the electrode conveyance unit 110 are for cutting the positive electrode substrate 20A to form positive electrodes 20. The cutting blades 115 and 116 are arranged so as to be adjacent to each other along the intersecting direction Y, and cut the positive electrode substrate 20A into a predetermined shape to form positive electrodes 20. The cutting blade 115 is provided with a sharp linear blade at the distal end and cuts one end of the positive electrode substrate 20A in a linear shape along the intersecting direction Y. The cutting blade 116 is provided with a sharp blade, a portion of which is bent and formed in a stepped manner, at the distal end, and cuts the other end of the positive electrode substrate 20A immediately after the one end thereof is cut, in accordance with the shape of the positive electrode terminal 21a. A receptacle 117 is for receiving the cutting blade 115 and the cutting blade 116, which cut the positive electrode substrate 20A. The receptacle 117 is disposed opposing the cutting blade 115 and cutting blade 116 via the positive electrode substrate 20A to be transported. The electrode conveyance unit 110 transports the positive electrode 20 cut out from the positive electrode substrate 20A so as to pass between the first separator conveyance unit 120 and the second separator conveyance unit 130.

The first separator conveyance unit 120 cuts out a ceramic separator 40 for laminating on one surface of the positive electrode 20 (back surface side, downward along the lamination direction Z in FIG. 5) from the ceramic separator substrate 40A, and transports the ceramic separator to the separator bonding unit 140, as illustrated in FIGS. 5 and 6.

The first separator conveyance unit 120 is disposed on the downstream side of the electrode conveyance unit 110 in the transport direction X and downward along the lamination direction Z in FIGS. 5 and 6. The first separator feed roller 121 is for holding the ceramic separator substrate 40A. The first separator feed roller 121 has a cylindrical shape and an elongated ceramic separator substrate 40A is wound thereon. A first pressure roller 122 and a first nip roller 123 are for guiding the ceramic separator substrate 40A to a first conveyance drum 124, while applying a constant tension thereon. The first pressure roller 122 and the first nip roller 123 are arranged facing each other, and each have an elongated cylindrical shape.

The first conveyance drum 124 is for transporting the ceramic separator substrate 40A to the separator bonding unit 140. The first conveyance drum 124 causes a ceramic separator 40 that has been cut in a rectangular shape to approach and be laminated on one surface (back surface side, downward along the lamination direction Z in FIG. 5) of a positive electrode 20 that has been transported from the electrode conveyance unit 110. The ceramic layer 42 side of the ceramic separator 40 is opposed to one surface of the positive electrode 20. The first conveyance drum 124 has a cylindrical shape, and is provided with a plurality of suction openings on the outer perimeter surface thereof. When the first conveyance drum 124 of the first separator conveyance unit 120 is rotated, the first separator feed roller 121 is driven and rotated, in addition to the first pressure roller 122 and the first nip roller 123. The first cutting blade 125 is for cutting the elongated ceramic separator substrate 40A to form ceramic separators 40. The first cutting blade 125 is provided with a sharp linear blade at the distal end, arranged along the intersecting direction Y which intersects the transport direction X, and cuts the elongated ceramic separator substrate 40A which is being suctioned by the first conveyance drum 124 at a constant length.

The second separator conveyance unit 130 cuts out a ceramic separator 40 for laminating on the other surface that opposes the one surface of the positive electrode 20 (front surface side, upward along the lamination direction Z in FIG. 5) from the ceramic separator substrate 40A, and transports the ceramic separator to the separator bonding unit 140, as illustrated in FIGS. 5 and 6.

The second separator conveyance unit 130 is disposed on the downstream side of the electrode conveyance unit 110 in the transport direction X and upward along the lamination direction Z in FIGS. 5 and 6. That is, the second separator conveyance unit 130 is disposed opposing the first separator conveyance unit 120 along the lamination direction Z such that the opposed faces are oriented in the same direction. The second separator feed roller 131, the second pressure roller 132, the second separator conveyance unit 133, the second conveyance drum, 134, and the second cutting blade 135 of the second separator conveyance unit 130 are configured in the same manner as the first separator feed roller 121, the first pressure roller 122, the first nip roller 123, the first conveyance drum 124, and the first cutting blade 125 of the first separator conveyance unit 120.

The separator bonding unit 140 bonds a pair of ceramic separators 40 to each other, as illustrated in FIGS. 5 and 6.

The separator bonding unit 140 embodies the bonding step of the bonding method. In the bonding step, an ultrasonic wave is applied to the ceramic separators 40 while applying pressure thereto with a processing member (ultrasonic horn 141), and heat T is applied to the binder 42N by a heating member (heater 147). In this manner, the ceramic particles 42M are moved from the bonding portion 40h into the surrounding area and the opposed polypropylene layers 41 are bonded to each other. Here, in the bonding step, the binder 42N is heated by the heater 147 to a temperature that is greater than or equal to the glass transition temperature and less than the melting point.

The separator bonding unit 140 is disposed on the downstream side of the first separator conveyance unit 120 and the second separator conveyance unit 130 in the transport direction X, one set each at the two sides along the transport direction X. In the separator bonding unit 140, the ultrasonic horn 141, the booster 142, the oscillator 143, the pressing member 144, and the drive stage 145 are disposed above the pair of ceramic separators 40 in FIG. 6. On the other hand, the anvil 146, the heater 147, the sensor 148, and the heater block 149 are disposed below the pair of ceramic separators 40 in FIG. 6.

The ultrasonic horn 141 of the separator bonding unit 140 corresponds to the processing member, and is for applying an ultrasonic wave to the ceramic separators 40 while applying pressure thereto, to heat the ceramic separator 40. The ultrasonic horn 141 is made of metal, integrally forming a rectangular main body portion 141a and a protrusion 141b protruding from the corner of the main body portion 141a. The protrusion 141b of the ultrasonic horn 141 is abutted with the polypropylene layer 41 of the ceramic separator 40. The ultrasonic horn 141 generates frictional heat for heating the bonding surface between the ceramic layers 42, which intersects the lamination direction Z, and which is vibrated by applying an ultrasonic wave therealong.

The booster 142 of the separator bonding unit 140 is for amplifying the ultrasonic wave that is emitted from the oscillator 143 while propagating the same to the ultrasonic horn 141. The booster 142 is disposed between the ultrasonic horn 141 and the oscillator 143. The booster 142 is made of metal and formed in a cylindrical shape. The oscillator 143 is for generating an ultrasonic wave. One end of the oscillator 143 is fastened to the booster 142. The oscillator 143 generates a vibration corresponding to the frequency of the ultrasonic wave by electric power that is supplied from the outside. The pressing member 144 is for pressing the ultrasonic horn 141 to the ceramic separator 40. One end of the pressing member 144 is formed in an annular shape, and the booster 142 that is connected to the ultrasonic horn 141 is inserted therethrough. The drive stage 145 is for causing the pressing member 144 to approach or separate from the ceramic separator 40. The drive stage 145 is coupled to one end of the pressing member 144. The drive stage 145 uses a single-axis linear stage.

The anvil 146 of the separator bonding unit 140 corresponds to a biasing member, and biases a pair of ceramic separators 40 to the ultrasonic horn 141 side. The anvil 146 is disposed facing the protrusion 141b of the ultrasonic horn 141 along the lamination direction Z. The anvil 146 is immobile, and biases the ultrasonic horn 141 by the repulsive force due to being pressed by the ultrasonic horn 141 via the pair of ceramic separators 40. The anvil 146 is made of metal and formed in a rectangular shape. The heater 147 corresponds to a heating member, and is for applying heat T to the binder 42N. The heater 147 heats the binder 42N of the ceramic layer 42 to a temperature that is greater than or equal to the glass transition temperature and less than the melting point. In order to suppress a burn-through of the polypropylene layer 41, which corresponds to the melting material, the temperature to which the binder 42N is heated is preferably less than the melting point of the melting material. The heater 147 is housed in the heater block 149 and disposed in proximity to the anvil 146. The heater 147 is made of, for example a heating wire, a thermocouple, or Peltier elements, etc. The heater 147 applies heat T to the binder 42N via the anvil 146.

The sensor 148 of the separator bonding unit 140 corresponds to a measurement member, and is for measuring the temperature of the ceramic separator 40. The sensor 148 is housed in the heater block 149 and disposed in proximity to the heater 147. The sensor 148 is made of, for example, a thermocouple. The heater block 149 is for mounting the anvil 146, and for housing the heater 147 and the sensor 148. The heater block 149 is made of metal, and is formed in a rectangular shape comprising an internal space.

Here, the separator bonding unit 140 may be configured to move toward the downstream side in the transport direction X so as to follow the movement of the first separator conveyance unit 120 and the second separator conveyance unit 130, while the ultrasonic horn 141 and the anvil 146 are sandwiching and bonding the pair of ceramic separators 40. In this case, the separator bonding unit 140 returns toward the upstream side in the transport direction X at high speed after the bonding of the pair of ceramic separators 40 is completed. If configured in this manner, the separator bonding unit 140 is capable of bonding a pair of ceramic separators 40 without temporarily stopping the rotations of the first conveyance drum 124 and the second conveyance drum 134, etc.

The bagged electrode conveyance unit 150, illustrated in FIGS. 5 and 6, conveys the bagged electrode 11 that is formed by the separator bonding unit 140.

The bagged electrode conveyance unit 150 is adjacent to the electrode conveyance unit 110 along the transport direction X, and is disposed on the downstream side of the first separator conveyance unit 120 and the second separator conveyance unit 130 in the transport direction X. The conveyor belt 151 is for transporting the bagged electrode 11. The conveyor belt 151 comprises an endless belt provided with a plurality of suction openings in the outer perimeter surface, and transports the bagged electrode 11 under a suction state along the transport direction X. The width of the conveyor belt 151 along the intersecting direction Y which intersects the transport direction X is shorter than the width of the bagged electrode 11. That is, the two ends of the bagged electrode 11 protrude outwardly from the conveyor belt 151, with respect to the intersecting direction Y. In this manner, the conveyor belt 151 avoids interference with the separator bonding unit 140. The rotating roller 152 is for rotating the conveyor belt 151. A plurality of rotating rollers 152 are arranged on the inner surface of the conveyor belt 151 along the intersecting direction Y. The rotating roller 152 does not protrude from the conveyor belt 151 in order to avoid interference with the separator bonding unit 140. Of the plurality of rotating rollers 152, one is a drive roller provided with power and the others are driven rollers which are driven with the drive roller.

The suction pad 153 of the bagged electrode conveyance unit 150 is for suctioning the bagged electrode 11. The suction pad 153 is positioned so as to oppose the bagged electrode 11 in the lamination direction Z of FIG. 5, above the bagged electrode 11, which is located on the conveyor belt 151. The suction pad 153 has a plate shape, and is provided with a plurality of suction openings on the surface that abuts the bagged electrode 11. The elastic member 154 is for moving the suction pad 153 up and down along the lamination direction Z. One end of the elastic member 154 is attached to the suction pad and the other end is anchored to the X-axis stage 155 and the X-axis auxiliary rail 156. The elastic member 154 can be freely extended along the lamination direction Z, powered by an air compressor or the like. The X-axis stage 155 and the X-axis auxiliary rail 156 are for moving the elastic member 154 that has been attached to the suction pad 153 along the transport direction X. The X-axis stage 155 is disposed along the transport direction X, and moves the elastic member 154 along the transport direction X. The X-axis auxiliary rail 156 is disposed parallel to the X-axis stage 155, and assists the movement of the elastic member 154 by the X-axis stage 155. The mounting table 157 temporarily stores the bagged electrode 11. The mounting table 157 has a plate shape, and is disposed further on the downstream side than the conveyor belt 151 along the transport direction X.

The control unit 160, illustrated in FIG. 5, controls the respective operations of the electrode conveyance unit 110, the first separator conveyance unit 120, the second separator conveyance unit 130, the separator bonding unit 140, and the bagged electrode conveyance unit 150.

The controller 161 of the control unit 160 corresponds to a control member, and controls the bonding device 100. The controller 161 comprises ROM, CPU, and RAM. The ROM (Read Only Memory) stores a control program relating to the bonding device 100. The control program includes those related to the controls of the rotating roller 114 and the cutting blades 115 and 116 of the electrode conveyance unit 110, the first conveyance drum 124 and the first cutting blade 125 of the first separator conveyance unit 120, and the second conveyance drum 134 and the second cutting blade 135 of the second separator conveyance unit 130. Furthermore, the control program includes those related to the controls of the oscillator 143, the drive stage 145, the heater 147, and the sensor 148 of the separator bonding unit 140, and the rotating roller 152, the suction pad 153, the elastic member 154, and the X-axis stage 155 of the bagged electrode conveyance unit 150. The CPU (Central Processing Unit) controls the operation of each component member of the bonding device 100 based on the control program. In particular, the CPU controls the temperature of the heater 147 based on the measurement result of the sensor 148. The RAM (Random Access Memory) temporarily stores various data relating to each component member of the bonding device 100 being controlled. Data are, for example, the temperature measured by the sensor 148 of the separator bonding unit 140.

Next, the operation of the bonding device 100 will be described with reference to FIGS. 7(A) and 7(B) in addition to FIGS. 5 and 6.

FIGS. 7(A) and 7(B) are partial cross-sectional views schematically illustrating the states in which a pair of ceramic separators 40 are bonded to each other by the bonding device 100 of FIG. 5.

The electrode conveyance unit 110 cuts the elongated positive electrode substrate 20A one by one into a predetermined shape to form positive electrodes 20 with the cutting blades 115 and 116, as illustrated in FIG. 5. The electrode conveyance unit 110 transports the positive electrode 20 between the first separator conveyance unit 120 and the second separator conveyance unit 130.

Next, the first separator conveyance unit 120 cuts out and transports a ceramic separator 40 for laminating on one surface of the positive electrode 20 from the ceramic separator substrate 40A, as illustrated in FIGS. 5 and 6. The elongated ceramic separator substrate 40A is cut with the first cutting blade 125 to a rectangular shape one by one to form ceramic separators 40. The first separator conveyance unit 120 laminates the ceramic separator 40 on one surface side (back surface side, downward along the lamination direction Z in FIG. 5) of the positive electrode 20 that is transported from the electrode conveyance unit 110.

In the same manner, the second separator conveyance unit 130 cuts out and transports a ceramic separator 40 for laminating on the other surface opposing the one surface of the positive electrode 20 from the ceramic separator substrate 40A, in conjunction with the operation of the first separator conveyance unit 120, as illustrated in FIGS. 5 and 6. The elongated ceramic separator substrate 40A is cut with the second cutting blade 135 to a rectangular shape one by one to form ceramic separators 40. The second separator conveyance unit 130 laminates the ceramic separator 40 on the other surface side (front surface side, upward along the lamination direction Z in FIG. 5) of the positive electrode 20 that is transported from the electrode conveyance unit 110.

Next, the separator bonding unit 140 bonds the pair of laminated ceramic separators 40 to each other so as to sandwich the positive electrode 20, as illustrated in particular in FIGS. 7(A) and 7(B) of FIGS. 5 to 7.

The state immediately after the bonding of the pair of ceramic separators 40 is started by the separator bonding unit 140 is illustrated in FIG. 7(A). The separator bonding unit 140 applies heat T to the binder 42N of the ceramic layer 42 of the pair of ceramic separators 40 with the heater 147 via the anvil 146, as illustrated in FIG. 7(A). The heater 147 heats the binder 42N to a temperature that is greater than or equal to the glass transition temperature and less than the melting point. In this manner, fluidity is expressed in the binder 42N to put the ceramic particles 42M in a movable state.

In addition, the state immediately before the bonding of a pair of ceramic separators 40 is completed by the separator bonding unit 140 is illustrated in FIG. 7(B). The separator bonding unit 140 applies an ultrasonic wave to the pair of ceramic separators 40 while applying pressure thereto by the ultrasonic horn 141, as illustrated in FIG. 7(B). The anvil 146 biases the ultrasonic horn 141 by the repulsive force due to being pressed by the ultrasonic horn 141 via the pair of ceramic separators 40. The ultrasonic horn 141 heats the pair of ceramic separators 40 by applying an ultrasonic wave along the bonding surface between the ceramic layers 42, which intersects the lamination direction Z. As a result, the ceramic layers 42, in which the ceramic particles 42M are in a movable state, are partially moved to the surrounding area, and bonds the polypropylene layers 41 to each other, which are newly opposed and in a softened state, to form a bonding portion 40h. In this manner, the separator bonding unit 140 is capable of sufficiently bonding a pair of ceramic separators 40, each comprising a polypropylene layer 41 and a ceramic layer 42 that greatly differ in the melting point from a state in which the ceramic layers 42 thereof are facing each other.

The bagged electrode conveyance unit 150 transports the bagged electrode 11 that is formed by the separator bonding unit 140, as illustrated in FIG. 5. The bagged electrode conveyance unit 150 temporarily mounts and stores the bagged electrode 11 on the mounting table 157.

In accordance with the first embodiment described above, the action and effects are achieved by the following configurations.

The method for bonding composite materials (ceramic separators 40) uses composite materials (ceramic separators 40), each provided with a melting material (polypropylene layer 41) and a heat-resistant material (ceramic layer 42) comprising a heat-resistant member (ceramic particles 42M) having a higher melting temperature than the polypropylene layer 41 and a binder member (binder 42N) that binds the ceramic layer 42M to the polypropylene layer 41. In this bonding method, a pair of ceramic separators 40 are bonded to each other, with the ceramic layers 42 facing each other. This bonding method comprises a bonding step. In the bonding step, an ultrasonic wave is applied to the ceramic separators 40 while applying pressure thereto with a processing member (ultrasonic horn 141), and heat T is applied to the binder 42N by a heating member (heater 147). In this manner, the ceramic particles 42M are moved from the bonding portion 40h to the surrounding area and the opposed polypropylene layers 41 are bonded to each other. Here, in the bonding step, the binder 42N is heated by the heater 147 to a temperature that is greater than or equal to the glass transition temperature and less than the melting point.

The device 100 for bonding composite materials (ceramic separators 40) uses composite materials (ceramic separators 40), each provided with a melting material (polypropylene layer 41) and a heat-resistant material (ceramic layer 42) comprising a heat-resistant member (ceramic particles 42M) having a higher melting temperature than the polypropylene layer 41 and a binder member (binder 42N) that binds the ceramic layer 42M to the polypropylene layer 41. In this bonding device 100, a pair of ceramic separators 40 are bonded to each other, with the ceramic layers 42 facing each other. The bonding device 100 comprises a processing member (ultrasonic horn 141) and a heating member (heater 147). The ultrasonic horn 141 applies an ultrasonic wave to the ceramic separator 40 while applying pressure to the ceramic separator 40. The heater 147 heats the binder 42N to a temperature that is greater than or equal to the glass transition temperature and less than the melting point.

In accordance with such a configuration, the ceramic separators 40 are heated by applying an ultrasonic wave thereto while applying pressure from the side with the polypropylene layer 41, while the binder 42N is heated to a temperature that is greater than or equal to the glass transition temperature and less than the melting point. By heating the ceramic separators 40 in this manner, it is possible to promote fluidity in the binder 42N and to promote the movement of the ceramic particles 42M. Therefore, it is possible to bond the polypropylene layers 41 to each other, which are newly opposed and in a softened state, by partially moving the ceramic layers 42 that are facing each other to the surrounding area. That is, it is possible to sufficiently bond a pair of ceramic separators 40 each comprising a polypropylene layer 41 and a ceramic layer 42 that greatly differ in the melting point from a state in which the ceramic layers 42 thereof are facing each other.

In addition, particularly in the bonding method, the bonding step may be configured to apply an ultrasonic wave to the ceramic separators 40 by the ultrasonic horn 141 while applying heat T to the binder 42N with the heater 147.

In accordance with such a configuration, it is possible to heat the ceramic separators 40 by applying an ultrasonic wave thereto while pressing from the polypropylene layer 41 side, while maintaining a state in which fluidity is expressed in the binder 42N of the ceramic layer 42, and constantly keeping the ceramic particles 42M in a movable state. Therefore, it is possible to move the ceramic layers 42 that are facing each other to the surrounding area extremely smoothly.

In addition, particularly in the bonding method, the bonding step may be configured to apply heat T to the binder 42N with the heater 147 before applying an ultrasonic wave to the ceramic separators 40 by the ultrasonic horn 141.

In accordance with such a configuration, it is possible to heat the ceramic separators 40 by applying an ultrasonic wave thereto while pressing from the polypropylene layer 41 side, by promoting fluidity in the binder 42N of the ceramic layer 42 to put the ceramic particles 42M in a movable state. Therefore, it is possible to move the ceramic layers 42 that are facing each other to the surrounding area extremely smoothly.

Additionally, particularly in the bonding method, the bonding step may be configured to apply an ultrasonic wave along the bonding surface between the ceramic layers 42 by the ultrasonic horn 141.

In accordance with such a configuration, it is possible to vibrate the ceramic particles 42M and the binder 42N along the bonding surface between the ceramic layers 42. Therefore, it is possible to move the ceramic layers 42 that are facing each other to the surrounding area extremely smoothly using the vibration of the ultrasonic wave.

Furthermore, particularly in the bonding method, the temperature at which the binder 42N is heated with the heater 147 may be configured to be a temperature that is below the melting point of the polypropylene layer 41.

In accordance with such a configuration, it is possible to sufficiently suppress a burn-through of the polypropylene layer 41.

In addition, in particular, the bonding device 100 may be configured to comprise a biasing member (anvil 146) that faces the ultrasonic horn 141 across the pair of ceramic separators 40, and that biases the pair of ceramic separators 40 to the ultrasonic horn 141 side. Here, the heater 147 applies heat T to the binder 42N via the anvil 146.

In accordance with such a configuration, it is possible sufficiently press the pair of ceramic separators 40 with the ultrasonic horn 141 and the anvil 146, while extremely efficiently applying heat T to the binder 42N that is positioned in the bonding portion 40h via the anvil 146. That is, it is possible to promote fluidity in the binder 42N of the ceramic layer 42 extremely efficiently by heating via the anvil 146 to put the ceramic particles 42M in a movable state.

In addition, in particular, the bonding device 100 may be configured to comprise a measurement member (sensor 148) and a control member (controller 161). The sensor 148 measures the temperature of the heater 147. The controller 161 controls the temperature of the heater 147 based on the measurement result of the sensor 148.

In accordance with such a configuration, it is possible to heat the binder 42N in consideration of the effect of temperature variation caused by applying an ultrasonic wave with the ultrasonic horn 141. That is, it is possible to accurately control the temperature of the binder 42N with the sensor 148 and the controller 161 to greater than or equal to the glass transition temperature and less than the melting point, without depending on the state of the ultrasonic wave that is applied by the ultrasonic horn 141.

Second Embodiment

A bonding device 200 that embodies the method for bonding composite materials (ceramic separators 40) in accordance with the second embodiment will be described, with reference to FIG. 8.

The bonding device 200 in accordance with the second embodiment is different from the bonding device 100 in accordance with the first embodiment described above, in the configuration in which the two sides of the pair of ceramic separators 40 along the transport direction X are subjected to seam welding. In the bonding device 100 described above, the two sides of the pair of ceramic separators 40 are spot welded.

In the second embodiment, the same codes are used for configurations that are the same as the first embodiment described above, and the descriptions thereof are omitted.

The configuration and the operation of the bonding method 200 that embodies the method for bonding composite materials (ceramic separators 40) will be described in order, with reference to FIG. 8.

Figure 8:
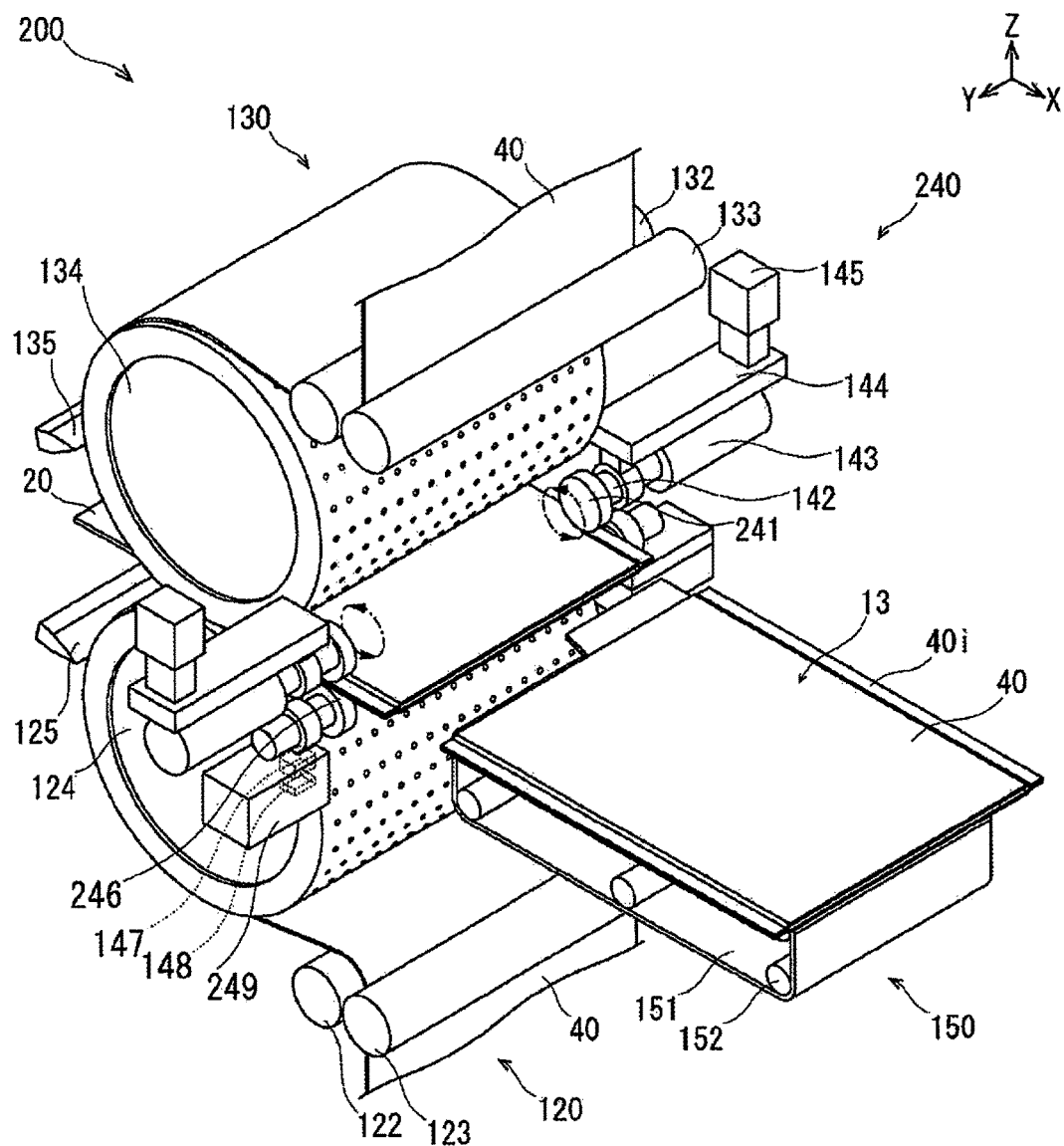
FIG. 8 is a perspective view illustrating the main parts of a device for bonding composite materials in accordance with a second embodiment.

FIG. 8 is a perspective view illustrating the principle parts of the bonding device 200.

The separator bonding unit 240 continuously bonds the two sides of a pair of ceramic separators 40 along the transport direction X to form a bagged electrode 13 comprising a linear bonding portion 40i. The separator bonding unit 240 is disposed on the downstream side of the first separator conveyance unit 120 and the second separator conveyance unit 130 in the transport direction X, one set each at the two sides along the transport direction X. That is, unlike the above-described separator bonding unit 140, in the separator bonding unit 240, each component material is disposed along the intersecting direction Y which intersects the transport direction X. Compared to the separator bonding unit 140, the separator bonding unit 240 differs in the configurations of the ultrasonic horn 241, the anvil 246, and the heater block 249.

The ultrasonic horn 241 of the separator bonding unit 240 is for applying an ultrasonic wave to the ceramic separator 40. The ultrasonic horn 241 is made of metal and formed in a disk shape. The ultrasonic horn 241 is rotatably disposed along the transport direction X of the pair of ceramic separators 40. The ultrasonic horn 241 is pressed by the pressing member 144 and presses the polypropylene layer 41 of one ceramic separator 40 of the pair of ceramic separators 40. The ultrasonic horn 241 presses the ceramic separator 40 while rotating, and heats the pair of ceramic separators 40 by applying an ultrasonic wave along the bonding surface between the ceramic layers 42, which intersects the lamination direction Z.

The anvil 246 of the separator bonding unit 240 is for biasing the pair of ceramic separators 40 to the ultrasonic horn 241 side. The anvil 246 is opposed to the ultrasonic horn 241 across the pair of ceramic separators 40. The anvil 246 is made of metal and formed in a disk shape. The ultrasonic horn 241 is rotatably disposed along the transport direction X of the pair of ceramic separators 40. The anvil 246 biases the ultrasonic horn 241 while being rotated. The heater block 249 is for holding the anvil 246 and for housing the heater 147 and the sensor 148. One end of the heater block 249 is formed in an annular shape, through which the rear of the anvil 246 is inserted. The heater block 249 houses the heater 147 and the sensor 148 therein.

In accordance with the second embodiment described above, the action and effects are achieved by the following configurations.

In the bonding device 200, the ultrasonic horn 241 is formed in a disk shape that is rotatable along the transport direction X of the pair of ceramic separators 40, and applies an ultrasonic wave to the polypropylene layer 41 while continuously applying pressure thereto.

In accordance with such a configuration, it is possible to form a linear bonding portion 40i by continuously bonding the two sides of a pair of ceramic separators 40 along the transport direction X by so-called seam welding. Therefore, it is possible to more strongly bond the two sides of the pair of ceramic separators 40.

In addition, in accordance with such a configuration, since the ultrasonic horn carries out welding by abutting the two side portions of the pair of ceramic separators 40 while being rotated, the ultrasonic horn 241 is not easily adhered to the polypropylene layer 41. Therefore, it is possible to prevent the ultrasonic horn 241 from being moved by being attached to the polypropylene layer 41, preventing the ceramic separators 40 from being damaged.

Furthermore, in accordance with such a configuration, it is sufficient to rotatably bring the ultrasonic horn 241 in contact with the polypropylene layer 41 of the ceramic separator 40. That is, it is possible to transport and bond the pair of ceramic separators 40, in a state of continuing the rotations of the first conveyance drum 124 and the second conveyance drum 134.

Furthermore, the biasing member (anvil 246) may be formed in a disk shape that is rotatable along the transport direction X of the pair of ceramic separators 40, and configured to continuously bias the pair of ceramic separators 40 to the side with the ultrasonic horn 241.

In accordance with such a configuration, it is possible to sandwich and sufficiently press the pair of ceramic separators 40 with the ultrasonic horn 241 and the anvil 246. Therefore, compared to when pressing the pair of ceramic separators 40 only with the ultrasonic horn 241, it is possible to partially move the ceramic layers 42 to the surrounding area more reliably, to form the bonding portion 40i.

Besides the above, various modifications to the present invention based on the configurations described in the claims are possible, which also belong in the scope of the present invention.

For example, in the first and the second embodiments, a configuration was described in which opposed polypropylene layers 41 are bonded to each other by partially moving the ceramic layers 42 of the pair of ceramic separators 40 to the surrounding area and made coarse. Here, it is not necessary to move the ceramic layers 42 of the region that becomes the bonding portion 40h completely to the surrounding area; it is sufficient to move to the extent that the ceramic layers become coarse. That is, it is also possible to bond opposed polypropylene layers 41 to each other, in a state in which a portion of the ceramic layers 42 remains in the site that becomes the bonding portion 40h.

In addition, in the first and second embodiments, configurations were described in which, in a bagged electrode 11 that configures a lithium ion secondary battery 1, a pair of ceramic separators 40 that are used in the bagged electrode 11 are bonded to each other, but no limitation is imposed thereby. The invention may be applied to bonding composite materials other than the ceramic separators 40 that are used in a bagged electrode 11 that configures a lithium ion secondary battery 1.

In addition, in the first and second embodiments, the secondary battery was described as having a lithium ion secondary battery 1 configuration, but no limitation is imposed thereby. The secondary battery may be configured as, for example, a polymer lithium battery, a nickel-hydrogen battery, or a nickel-cadmium battery.

In addition, a configuration was described in the first and the second embodiments in which the heat-resistant material of the ceramic separator 40 is a ceramic layer 42, but the invention is not limited to such a configuration. The heat-resistant material is not limited to ceramic, and any member with a higher melting temperature than the melting material may be employed.

Additionally, a configuration was described in the first and the second embodiments in which the melting material of the ceramic separator 40 is a polypropylene layer 41, but the invention is not limited to such a configuration. The melting material is not limited to polypropylene, and any member with a lower melting temperature than the heat-resistant material may be employed.

In addition, a configuration was described in the first and the second embodiments in which the ceramic separator 40 is obtained by laminating a heat-resistant material (ceramic layer 42) on one surface of the melting material (polypropylene layer 41), but the invention is not limited to such a configuration. The ceramic separator 40 may be configured by laminating a heat-resistant material (ceramic layer 42) on both surfaces of the melting material (polypropylene layer 41).

Additionally, a configuration was described in the first and the second embodiments in which the bagged electrode 11 is formed by bagging a positive electrode 20 with a pair of ceramic separators 40, but the invention is not limited to such a configuration. The bagged electrode may be configured to be formed by bagging a negative electrode 30 with a pair of ceramic separators 40. In addition, the bagged electrode may be configured to be formed by inserting a positive electrode 20 or a negative electrode 30 after bonding a pair of ceramic separators 40 to each other.

Additionally, a configuration was described in the first and the second embodiments in which the positive electrode 20, the ceramic separator 40, and the bagged electrode 11 are automatically transported, but the invention is not limited to such a configuration. The positive electrode 20, the ceramic separator 40, or the bagged electrode 11 may be configured to be manually transported.

Furthermore, in the first embodiment, a configuration was described in which two sides of a pair of ceramic separators 40 are spot welded using an ultrasonic horn 141 and an anvil 146, but the invention is not limited to such a configuration. The invention may be configured to form a seam welding at the two ends of a pair of ceramic separators 40 by continuously forming a bonding portion.

Additionally, in the first embodiment, a configuration was described in which a pair of ceramic separators 40 are sandwiched while an ultrasonic wave is applied thereto by an anvil 146 and only one rectangular protrusion 141b that is provided with respect to the ultrasonic horn 141, but the invention is not limited to such a configuration. The ultrasonic horn 141 may be configured to comprise, for example, a plurality of protrusions in a matrix. In addition, the ultrasonic horn 141 can be configured to comprise, for example, a protrusion that is curved or having a sharpened tip.

Furthermore, in the second embodiment, a configuration was described in which two sides of a pair of ceramic separators 40 are subjected to seam welding using a disk-shaped ultrasonic horn 241 and a disk-shaped anvil 246, but the invention is not limited to such a configuration. The invention may be configured such that the two sides of a pair of ceramic separators 40 are spot welded by separating a disk-shaped ultrasonic horn 241 and anvil 246 from a pair of ceramic separators 40 at regular intervals. In such a configuration, it is possible to bond the two sides of a pair of ceramic separators 40 that are being transported while continuing the rotations of the first conveyance drum 124 and the second conveyance drum 134.

The invention claimed is:

1. A bonding method for bonding a pair of composite materials that are each provided with a melting material and a heat-resistant material, in which each of the heat-resistant materials includes a heat-resistant member having a higher melting temperature than the melting material and a binder member that binds the heat-resistant member to the melting material, with the heat-resistant materials facing each other, the bonding method comprising:

bonding the composite materials by applying an ultrasonic wave to the composite materials while applying pressure thereto with a processing member; and applying heat to the binder members with a heating member to thereby move the heat-resistant members from a bonding portion to a surrounding area to bond the melting materials that are opposed to each other, the applying of the heat to the binder members with the heating member to a temperature that is greater than or equal to a glass transition temperature of the binder members and less than melting point of the binder members.

2. The bonding method according to claim 1, wherein the applying of the heat to the binder members with the heating member being applied while the applying of the ultrasonic wave to the composite materials with the processing member.

3. The bonding method according to claim 1, wherein the applying of the heat to the binder members with the heating member being applied before the applying of the ultrasonic wave to the composite materials with the processing member.

4. The bonding method according to claim 1, wherein the applying of the ultrasonic wave being applied along a bonding surface between the heat-resistant members with the processing member.

5. The bonding method according to claim 1, wherein the temperature at which the binder members are heated with the heating member is less than the melting point of the melting material.

6. The bonding method according to claim 2, wherein the applying of the heat to the binder members with the heating member being applied before the applying of the ultrasonic wave to the composite materials with the processing member.

7. The bonding method according to claim 2, wherein the applying of the ultrasonic wave being applied along a bonding surface between the heat-resistant members with the processing member.

8. The bonding method according to claim 2, wherein the temperature at which the binder members are heated with the heating member is less than the melting point of the melting material.

9. The bonding method according to claim 3, wherein the applying of the ultrasonic wave being applied along a bonding surface between the heat-resistant members with the processing member.

10. The bonding method according to claim 3, wherein the temperature at which the binder members are heated with the heating member is less than the melting point of the melting material.

* * * * *